United States Patent
Ludwig et al.

(10) Patent No.: US 9,635,317 B1
(45) Date of Patent: Apr. 25, 2017

(54) PERMISSION BASED CAMERA WITH ENCRYPTED PHOTO AND VIDEO OUTPUT

(71) Applicant: Bit Machine Labs LLC, Seattle, WA (US)

(72) Inventors: John Ludwig, Bellevue, WA (US); Richard Tong, Seattle, WA (US)

(73) Assignee: Surround.IO, Seattle, WA (US)

( * ) Notice: Subject to any disclaimer, the term of this patent is extended or adjusted under 35 U.S.C. 154(b) by 10 days.

(21) Appl. No.: 14/273,477

(22) Filed: May 8, 2014

Related U.S. Application Data

(60) Provisional application No. 61/820,854, filed on May 8, 2013.

(51) Int. Cl.
*H04N 7/167* (2011.01)

(52) U.S. Cl.
CPC ................... *H04N 7/1675* (2013.01)

(58) Field of Classification Search
CPC .................................................... H04N 7/1675
USPC ............................................................ 380/241
See application file for complete search history.

(56) References Cited

U.S. PATENT DOCUMENTS

| 7,508,941 B1 * | 3/2009 | O'Toole et al. ............... 380/228 |
| 2004/0059752 A1 * | 3/2004 | Crandall et al. ........... 707/104.1 |
| 2011/0096922 A1 * | 4/2011 | Oya ................................ 380/28 |

* cited by examiner

*Primary Examiner* — Kambiz Zand
*Assistant Examiner* — Aubrey Wyszynski
(74) *Attorney, Agent, or Firm* — FSPLLC

(57) ABSTRACT

A camera includes logic to capture images and video (collectively, 'media') and to store the captured media internally to the camera in an encrypted format; the encrypted format including multiple regions encrypted with different keys, each key corresponding to a human subject or object identified in the media.

8 Claims, 14 Drawing Sheets

PERMISSION BASED CAMERA WITH ENCRYPTED PHOTO AND VIDEO OUTPUT

PRIORITY

This application claims priority under 35 USC119 to U.S. application Ser. No. 61/820,854, filed on May 8, 2013, which is incorporated by reference herein.

BACKGROUND

Conventional digital cameras produce unencrypted output. Encryption to captured images provided after an image is generated and stored is a operator option. Canon® provided the OSK-E3 kit for a period for some of its cameras for source encryption, but it has been discontinued. Many cameras perform face detection in captured images, but don't bind or associate the detection to a operator database. Some photo processing systems also perform face recognition and allow operators to input names and bind them to a contact database, but do not encrypt content. Social networks and photo sharing services provide the capability to tag people and share photos based on the people tagged in photos. They do not allow extensive control by people who are having their photos taken, nor do they provide a capability to repudiate and prevent free copying and distribution.

BRIEF DESCRIPTION OF DRAWINGS

To easily identify the discussion of any particular element or act, the most significant digit or digits in a reference number refer to the figure number in which that element is illustrated.

DESCRIPTION

Figure 1:
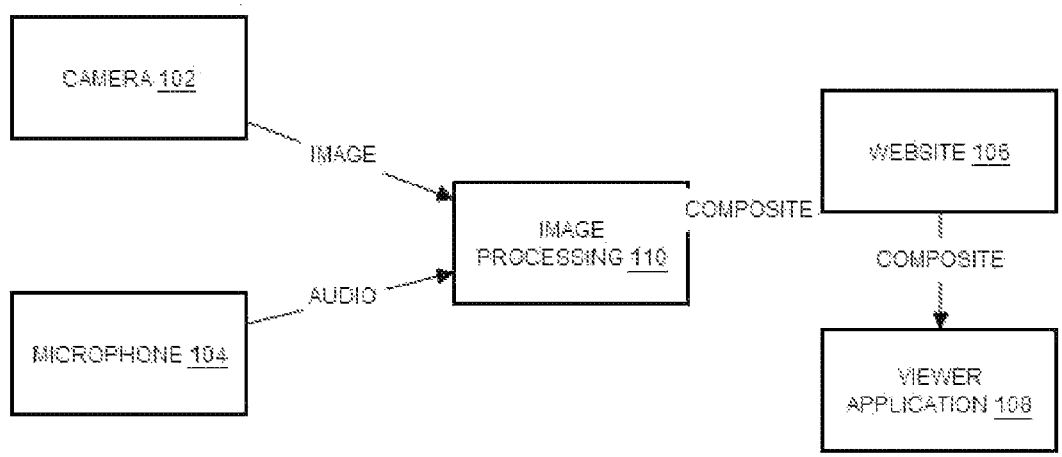
FIG. 1 is a system diagram of an embodiment of a permission-based camera system.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

(encryption) in this context refers to conversion of data into a form that can't be easily understood by unauthorized people. This form is commonly referred to as a ciphertext, or more commonly a cipher. Upon receipt of the encrypted data, it needs to be decrypted (changed back to normal data). Decryption on mobile, and most computerized devices, is done using a key. This key is an algorithm that can understand both the encryption and normal data. It takes the encrypted data and essentially translates it to a form of data we can read or interact with; logic to reformat data into a form from which its meaning is not easily extracted without use of a (usually secret) inverse process (web site) in this context refers to Also, a set of one or more web pages served from a single web domain. A web site is presented for access by external devices by at least one web server, and accessible via a network such as the Internet or a private local area network through an Internet address known as a Uniform Resource Locator. (URL) in this context refers to Uniform Resource Locator. A string of text that provides the address/location of a file or service on a computer network (usually the Internet.) The most common type of URL is a web address, which points to a specific web page. The complete form of such a URL starts with "http://" or "https://". Most web browsers have a place to enter URLs. Entering a specific URL lets the user go directly to any web page on the Internet. Most browsers accept incomplete URLs, such as "phonescoop.com" instead of the complete "http://www.phonescoop.com/".URLs can point to other types of files and services, and can involve Internet protocols other than HTTP that is used for the web. For example, a URL might point to a live video stream that a phone can display directly, without using the web browser. (Uniform Resource Locator) a character string that comprises a reference to a network resource, typically one that is accessible to a web browser via an interaction with a web server.

(Web page) in this context refers to a file configured for access and display via a web browser over the Internet, or Internet-compatible networks. Also, logic defining an information container that is suitable for access and display using Internet standard protocols. Content defined in a web page is typically accessed using a web browser, and displayed. Web pages may provide navigation to other web pages or content via hypertext links. Web pages frequently subsume other resources such as style sheets, scripts and images into their final presentation. Web pages may be retrieved for display from a local storage device, or from a remote web server via a network connection. Typically, a client device will transmit requests to a Web content server computer (also called Web server computer), requesting information. The Web content server computer responds to the request by providing information, typically in the form of Web pages, which are commonly encoded in a markup language file (e.g., HTML, XML). The provided information may include data, metadata (e.g., cookies) and/or executable code or scripts (e.g., JavaScript scripts).

(Web server) in this context refers to a device or device system that delivers web pages in response to requests for the web pages from web browsers. Also, logic to communicate web pages at the request of clients, most typically using the Hypertext Transfer Protocol (HTTP). The server communicates HTML documents and any additional content that may be included by a document, such as images, style sheets and scripts, as well as content referenced by certain types of links (pointers) in the web pages. A user agent, commonly a web browser or web crawler, initiates communication with the web server by making a request for a resource using (typically) HTTP, and the server responds with the content of that resource or an error message if unable to do so. The resource is typically a file on the server's secondary storage, but this is not necessarily the case. Many web servers have a capability of receiving content from clients. This feature is used for submitting web forms, including uploading of files.

(Web domain) in this context refers to an Internet Protocol (IP) resource, such as a personal computer used to access the Internet, a web server computer hosting a web site, the web site itself, or any other service communicated via the Internet. (IP) in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices. IP is the protocol used for communicating data across a packet-switched network used in most publicly accessible networks today. Connections that mobile devices make to GPRS, 3G and similar networks are made using IP.

(camera) in this context refers to Also, a device that records images and/or video, either as analog or as digital information signals. (image) in this context refers to information captured and stored by a device representing a visual perception, usually a two-dimensional picture. Images may be captured, stored, and communicated by devices in either analog or digital formats.

Some phones feature a camera that gives them the ability to work as a digital camera. Often (though not always) the camera is also able to shoot video. The most important characteristics of a camera are the resolution (measured in megapixels), lens focus type (either fixed or automatic) and the presence of a flash. The flash could be either LED (single or even double) or xenon. The number of megapixels is not always a good measurement of the quality of the photos, but if you plan to print pictures, you would generally get higher quality ones out of higher megapixel cameras. Auto focus lens are not a guarantee of better image quality, but fixed focus cameras are usually inferior. Most importantly, only auto focus cameras can allow shooting of really close objects—i.e. macro shooting. Some phones offer optical zoom but those are rare. Most use digital zoom, which degrades the quality of the photo. Cameras that can work in "video mode" are characterized by the maximum resolution and framerate (frames per second or fps) of the recorded video. A device that includes a light collecting chamber with an aperture fitted with a lens and a shutter through which the image of an object is projected onto a surface for recording (as on film) or for translation into electrical impulses (as for television broadcast)

(microphone) in this context refers to Also, an acoustic-to-electric transducer or sensor that converts sound into an electrical signal. Many microphones use electromagnetic induction (dynamic microphone), capacitance change (condenser microphone), piezoelectric generation, or light modulation to produce an electrical voltage signal from mechanical vibration; a device that converts vibrations in a physical medium (e.g., air) into electromagnetic signals (e.g., electrical signals)

(GPS) in this context refers to (Global Positioning System) logic to interact with multiple geosynchronous satellites to determine a terrestrial location. (Global Positioning System) a space-based satellite navigation system that provides location and time information in most weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver. The global positioning system is a location determination network that uses satellites to act as reference points for the calculation of position information.

(video) in this context refers to information captured and stored by a device representing a sequence of moving pictures. Video may be captured, stored, and communicated by devices in either analog or digital formats. (1) Refers to recording, manipulating, and displaying moving images, especially in a format that can be presented on a television. (2) Refers to displaying images and text on a computer monitor or mobile device. The video adapter, for example, is responsible for sending signals to the display device.(n.) A recording produced with a video recorder (camcorder) or some other device that captures full motion (audio) in this context refers to a representation of sound within a device or a physical storage or communication media, typically as either analog or digital signals (decryption) in this context refers to the inverse of encryption/encoding.

(key) in this context refers to the value utilized to encrypt or decrypt information (image) in this context refers to information captured and stored by a device representing a visual perception, usually a two-dimensional picture. Images may be captured, stored, and communicated by devices in either analog or digital formats.

(IP) in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices. IP is the protocol used for communicating data across a packet-switched network used in most publicly accessible networks today. Connections that mobile devices make to GPRS, 3G and similar networks are made using IP.

(GPS) in this context refers to (Global Positioning System) logic to interact with multiple geosynchronous satellites to determine a terrestrial location. (Global Positioning System) a space-based satellite navigation system that provides location and time information in most weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver. The global positioning system is a location determination network that uses satellites to act as reference points for the calculation of position information.

(WiFi) in this context refers to (also spelled Wi-Fi) logic that allows an electronic device to exchange data with another device or connect to a machine network such as the Internet wirelessly using radio waves. The term may refer to any logic that the Institute of Electrical and Electronics Engineers' (IEEE) 802.11 standards". The term "Wi-Fi" may thus be used as a synonym for "WLAN". A device comprising Wi-Fi (such as a personal computer, video-game console, smartphone, digital camera, tablet or digital audio player) can connect to a network resource such as the Internet via a wireless network access point. WiFi can refer to wireless local area network (WLAN) communication logic and techniques that are based on the Institute of Electrical and Electronics Engineers' (IEEE) 802.11 standards. Wi-Fi is a WLAN (Wireless Local Area Network) technology.

(DHCP) in this context refers to (Dynamic Host Configuration Protocol) is a standardized networking protocol used on Internet Protocol (IP) networks for dynamically distributing network configuration parameters, such as IP addresses for interfaces and services. With DHCP computers request IP addresses and networking parameters automatically from a DHCP server, reducing the need for a network administrator or a user from having to configure these settings manually.

(module) in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process.

(application) in this context refers to logic that can be independently installed, accessed, and removed from a device, and which executes at lower permission levels and within confines as to functionality and device resource utilization as determined by operating system software. Often referred to as "regular" application logic, as opposed to driver, applet, or system logic; also, logic that causes a computer to perform tasks beyond the basic operation of the computer itself. The term "application" may be abbreviated in some contexts to simply "app". An application may be logic built upon or integrated with operating system logic.

Examples of application logic include enterprise software, accounting software, office suites, graphics software, games, web browsers, and media players. Applications may be bundled with the computer and its system software or published separately. Application logic applies the capabilities of a particular computing platform or system software to a particular purpose. Some applications are available in versions for several different platforms; others have narrower requirements and are thus called, for example, a Geography application for Windows or an Android application for education or Linux gaming.

(public key) in this context refers to a public key in a PKI system (database) in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

(cache) in this context refers to a temporary storage facility in machine memory that does not survive the lifetime of the logic which creates the cache. A cache is the opposite of 'persistent storage'

(codec) in this context refers to Coder/decoder (server) in this context refers to logic designed to respond to requests for functionality from client logic that interacts with the server logic via a request/response model, often over a network. Thus, the server performs some operation utilizing the underlying resources of the device or devices hosting the server, on behalf of clients (request submitters). The client logic either executes on the same device or devices as the server logic, or interacts with the server logic through a machine data network.

(social network) in this context refers to online services such as Facebook, Twitter, Google+, LinkedIn, etc.

(acl) in this context refers to access control list, a mechanism for defining permissions in machine systems (file) in this context refers to an organization of machine memory including physical partitioning bounding the file contents and distinguishing the file contents from the contents of other areas of the memory, including other files. The file typically configures the machine memory so that an operating system or BIOS can access the file contents using an identifier, which is often a human-readable sequence of symbols (the file name)

A camera system is defined which encrypts content to prevent unauthorized viewing, and has a permissions system for configuring and enforcing the rights of both photographer and subjects. With today's cameras, photos and videos can be taken and distributed freely. A novel camera is described herein to deliver control back into the hands of camera subjects. When an image or video or other content is posted online, only authorized operators can view the content based on what permissions the original photographer and the subjects in the image allow. With the wide availability of cameras, people are literally under constant surveillance. The novel camera technology of this disclosure can accommodate legitimate surveillance goals while protecting the privacy of individuals.

With this system, the camera does not create unencrypted JPGs or video files. Instead each file is locked with digital encryption. A certain decryption key that depends on who is being photographed and who is taking the photo is required before the image or video file may be accessed for viewing, posting, and other operations involving reading, copying, or distribution.

The camera encrypts different portions of the image with different keys, based on which subjects are in the image. Each individual subject has control over the viewing of their image.

A camera system may include logic on a device with integral camera hardware (a smartphone, tablet, or a PC for instance). It may be a device with embedded logic for capturing videos or photos, for instance a webcam, a TV with integral cameras, or a security camera. The device includes logic to enable an IP or other network connection. The camera system is associated with an accompanying website.

Each camera system includes encryption software to digitally encrypt or digitally sign images or videos. Each camera includes a cryptographically secure unique key for the particular device. When the camera system is initialized it may determine its location via any available location service. Example location services are GPS if available, OS location services, and WiFi-based location services.

The camera system acquires an IP address (if IP is the preferred network communication protocol) via DHCP or any other available system, if necessary. The camera system communicates with the associated website, registering its unique ID and location. The camera system determines the identity of its operator via any of several mechanisms. For example the operator can use the camera, a phone, tablet, or computer with either a native application or a web interface to interact with the associated website and register their operatorship. The operator can use the camera, a phone, tablet, or computer with either a native application or a web interface to interact directly with a simple web interface on the camera system and register their operatorship.

The camera may include voice recognition and image recognition logic so the operator can interact and identify captured data through a natural language interface. The operator's public key is acquired by the camera system, and applied to cryptographically sign and secure the images/videos from the camera system. The public key may be entered by the operator at the camera device itself, at the accompanying website, or may be retrieved from a public authentication system such as the Facebook® OAUTH system, or from an enterprise name service like Microsoft® Active Directory.

The camera system can then be utilized to capture and record images or video. As the camera captures image or video, it detects the locations of faces and tracks the movement of faces through a stream of images or video. Face detection in individual frames or images may be performed using known techniques that need not be elaborated for a full and complete understanding of how the invention may be built and used.

The camera system may include vector analysis and predictive movement so that in frames without positive face detection, the camera system may estimate where the person is. The areas of the image/video defining faces are encrypted with a unique key for each face. These initial keys correspond to anonymous accounts; for example, unknown subject 1, unknown subject 2, unknown subject 3, etc.

The camera system further digitally signs each image or video and associated tags, such as EXIF tags, a tag for the camera operator, a tag for a picture location, and any additional tags, with its device key. This prevents later alteration of images/video or associated data such and helps ensure that the images/video were truly taken at a particular time and location.

The entire image or video is further encrypted with the operator's key. At some later time, the image or video is analyzed to identify the exact subjects of the images/video. The image or video may be processed immediately or some configured or selected time later, on the camera. The image or video may also be moved to a personal computer, tablet, or other device owned or controlled by the camera operator, and processed by logic on that machine. The image or video may also be uploaded to the associated website and processed on the website.

The image/video is analyzed in whole or in part at any of these manners, and may be analyzed multiple times at different locations to improve the subject identification. For instance, the camera may process some of an image for a fast initial identification of subjects, using cached operator information, and then analyze again later when the camera is not being operated for image capture. In another instance, an image may be communicated to the operator's personal computer, where a trusted logic component installed by the operator performs additional processing. Multiple passes of analysis allow subject recognition to progressively improve.

The camera system matches detected facial areas with facial data from a subject database. The subject database may be a local database created and maintained by the operator, it may be a remote directory service such as Microsoft Active Directory, or it may be a remote service such as Facebook.

The camera system may include a cache of known operators and facial information, resident in the camera device, or stored on or by a PC with an associated camera application, or on or by the camera system associated website. Recognition of frequent subjects may be accomplished more quickly than recognition of infrequent subjects. In addition to facial recognition, the system may increase the confidence of a match by several additional techniques. The system may also record sound and use voice recognition in addition to facial recognition. Subjects may login to the camera to securely identify themselves. Subjects may also utter a pass phrase (such as "It's me!") or present a distinctive gesture to the camera, allowing the camera to identify the subject and/or to associate those images/video with that operator. The system may also detect that a network-connected device is present (for instance, an iPhone or Android device) and assume the operator of the device is in the photo.

When a subject is recognized in an image, the portion of the image corresponding to that person is assigned to that person. In one instantiation, the portion is decrypted and re-encrypted using the public key of the recognized subject. In another instantiation, the anonymous key that was utilized to originally encrypt the portion is now assigned to a known subject account.

Additional areas of the image/video that may be associated with people may also be encrypted: entire bodies, visible body parts, well known belongings, identifiable personal information (license plate numbers, name tags, etc.) This may occur immediately at image/video capture time, or at a subsequent point in processing of the image.

If at a later level of processing, the camera system determines that a subject was mis-recognized, it may reassign recognized image areas to another subject. Unidentifiable people or personal information may be left encrypted, may be unencrypted, or may be smeared in the images/video to provide privacy. Additional areas of the photo may be encrypted based on subject/operator permissions. For instance, a parent may indicate that any recognizable minors in their photos should be encrypted, or an art collector may indicate that any artwork around them should be encrypted.

Additional areas of an image/video may be encrypted based on facial recognition and location information. For instance, someone may indicate that any photos taken in their house be fully encrypted. These encryption rules can be set per-photo or per-stream as they are captured by the camera, or the camera operator may create a set of default rules to apply to all or part of the content generated by the system. For instance the operator may configure that all images captured in a certain location are always fully encrypted, or that they are only encrypted during certain hours.

To view the image or video stream, a viewer can view on the associated website, or in a viewing application. The viewing application may exist on a PC or tablet or smartphone, and may be an app dedicated to viewing the camera system outputs, or may be app which supports installable codecs or decoders. In all cases, when the viewer tries to view the image/video, a decryption is attempted, and the decryption logic examines the image/stream and contacts the associated web service. If the viewer has the rights to see all or part of the image/stream, then those portions will be decrypted. If the viewer does not have the rights to see all or parts of the image/stream, that portion of the image or video will be either blank, or obscured, or replaced by substitute generic content. Rights and treatment may vary for different portions of the image and also potentially by the viewer. One subject may be fully viewable, another may be obscured. Legal authorities with approved court orders may have access complete images and streams. If a subject later decides that he doesn't want someone to view the subject's image, he or she can change those permissions and the image can no longer be decrypted. Rights can vary by viewer, for instance, to allow only certain people to see an image. Rights may vary by time, for example to allow an image to be seen only for the next 3 weeks; or by location, for instance allow an image to be seen only if it was taken at a certain location, or if viewed at a certain location.

Figure 2:
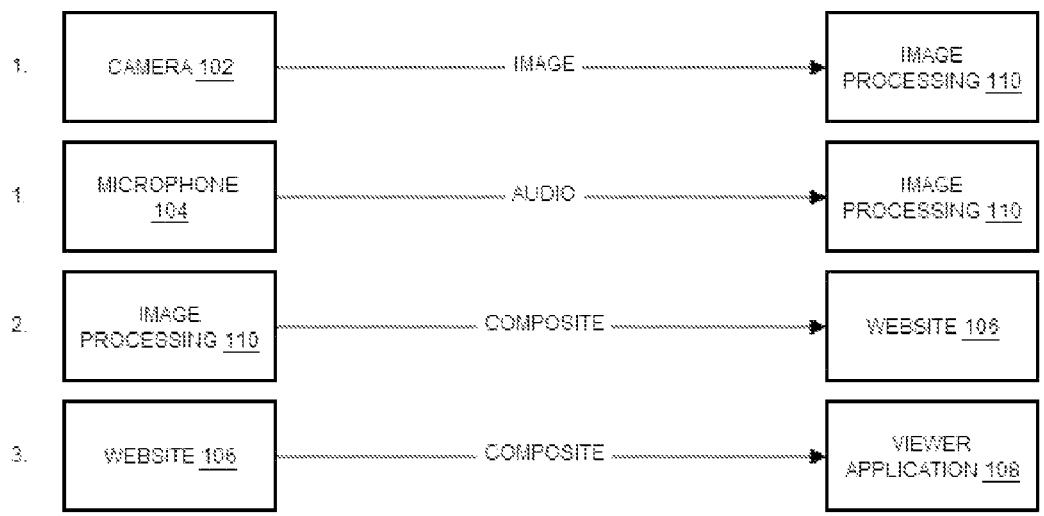
FIG. 2 is an action flow diagram of an embodiment of a permission-based camera system process.
Figure 3:
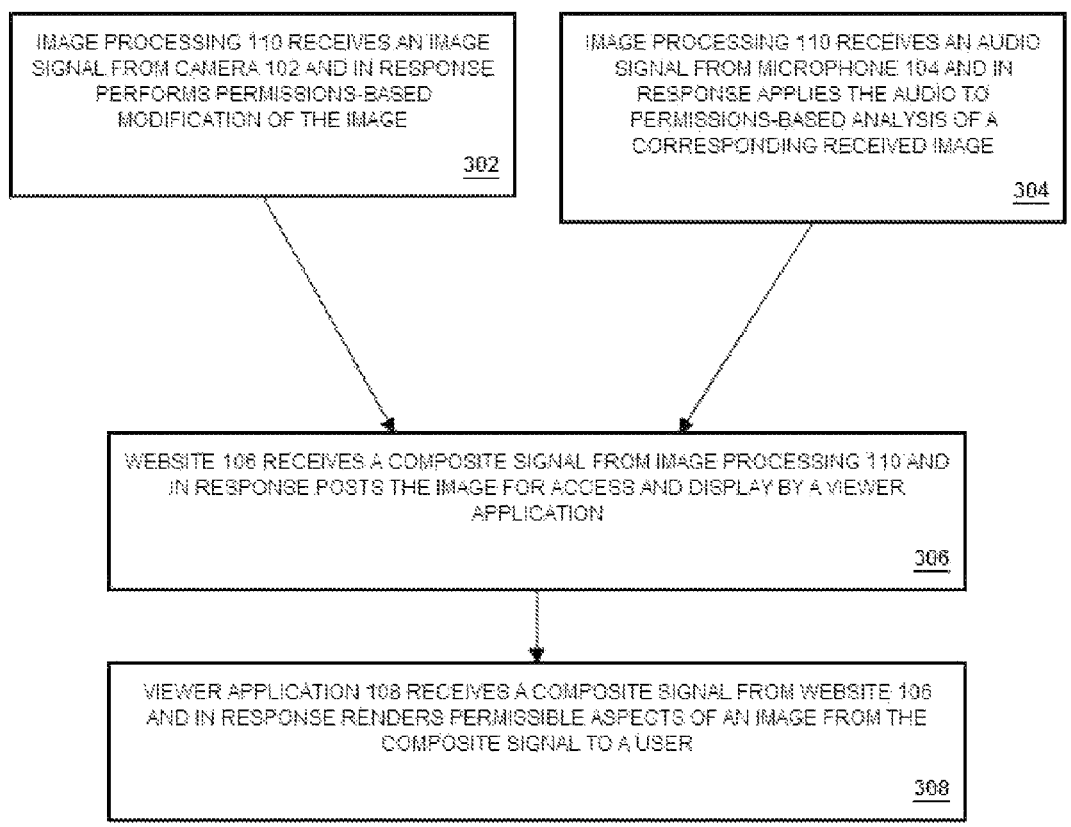
FIG. 3 is a flow chart of an embodiment of a permission-based camera system process.

FIG. 1 is a system diagram of an embodiment of a permission-based camera system. FIG. 2 is an action flow diagram of an embodiment of a permission-based camera system process. FIG. 3 is a flow chart of an embodiment of a permission-based camera system process. The system comprises camera 102, microphone 104, website 106, viewer application 108, and image processing 110. Image processing 110 receives an image signal from camera 102 and in response performs permissions-based modification of the image (302). In association with the image signal, image processing 110 receives an audio signal from microphone 104 and in response applies the audio to permissions-based analysis of a corresponding received image (304). Website 106 receives a composite signal from image processing 110 and in response posts the image for access and display by a viewer application (306). Viewer application 108 receives a composite signal from website 106 and in response renders permissible aspects of an image from the composite signal to a user (308).

The system may apply encryption keys in a manner to be described, to encrypt different aspects of an image according to subject rules and permissions.

Figure 4:
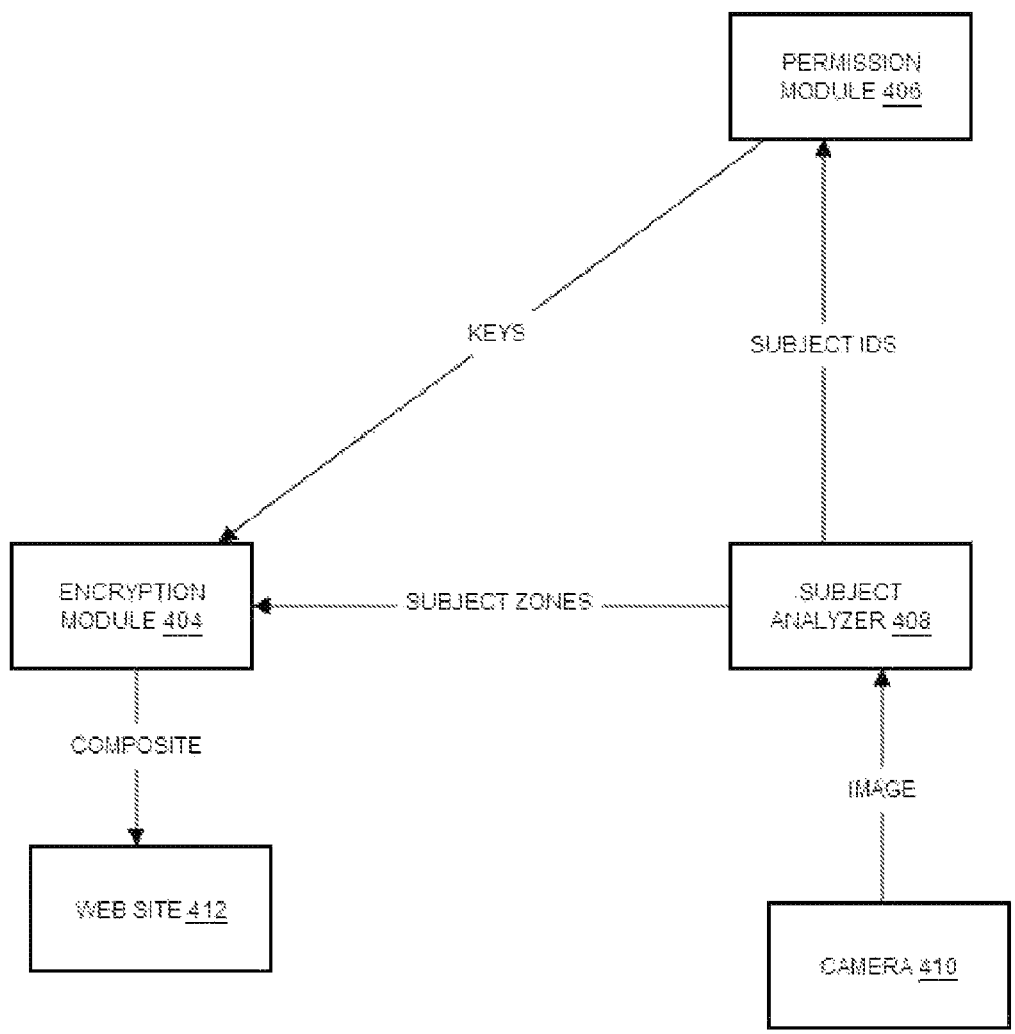
FIG. 4 is a system diagram of an embodiment of a system to apply permissions to subject zones in an image.
Figure 5:
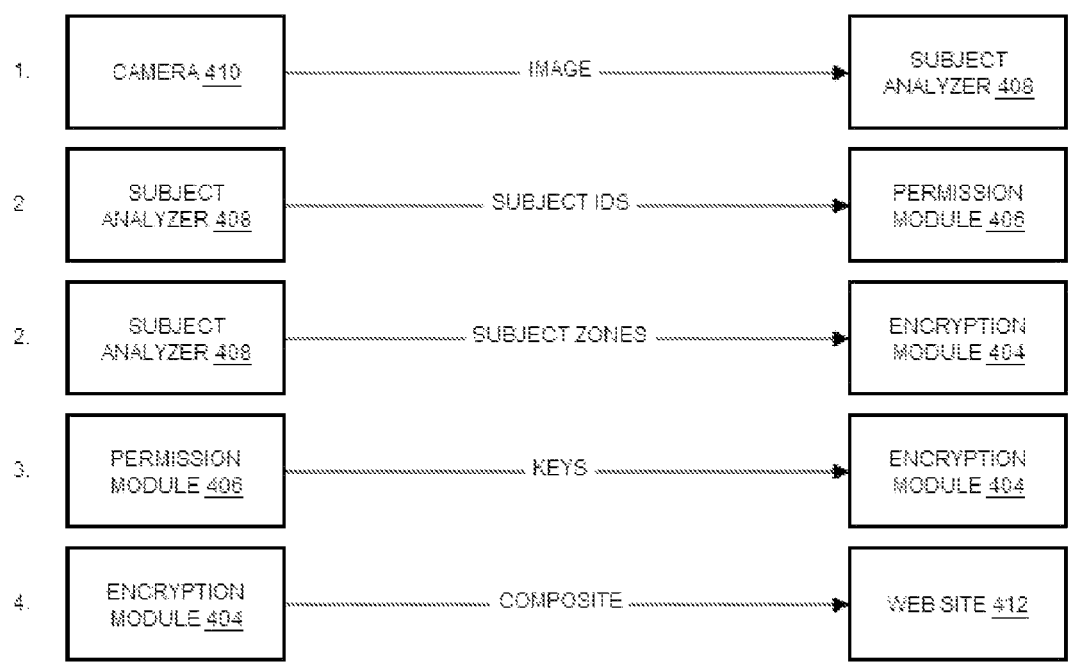
FIG. 5 is an action flow diagram of an embodiment of a system to apply permissions to subject zones in an image process.
Figure 6:
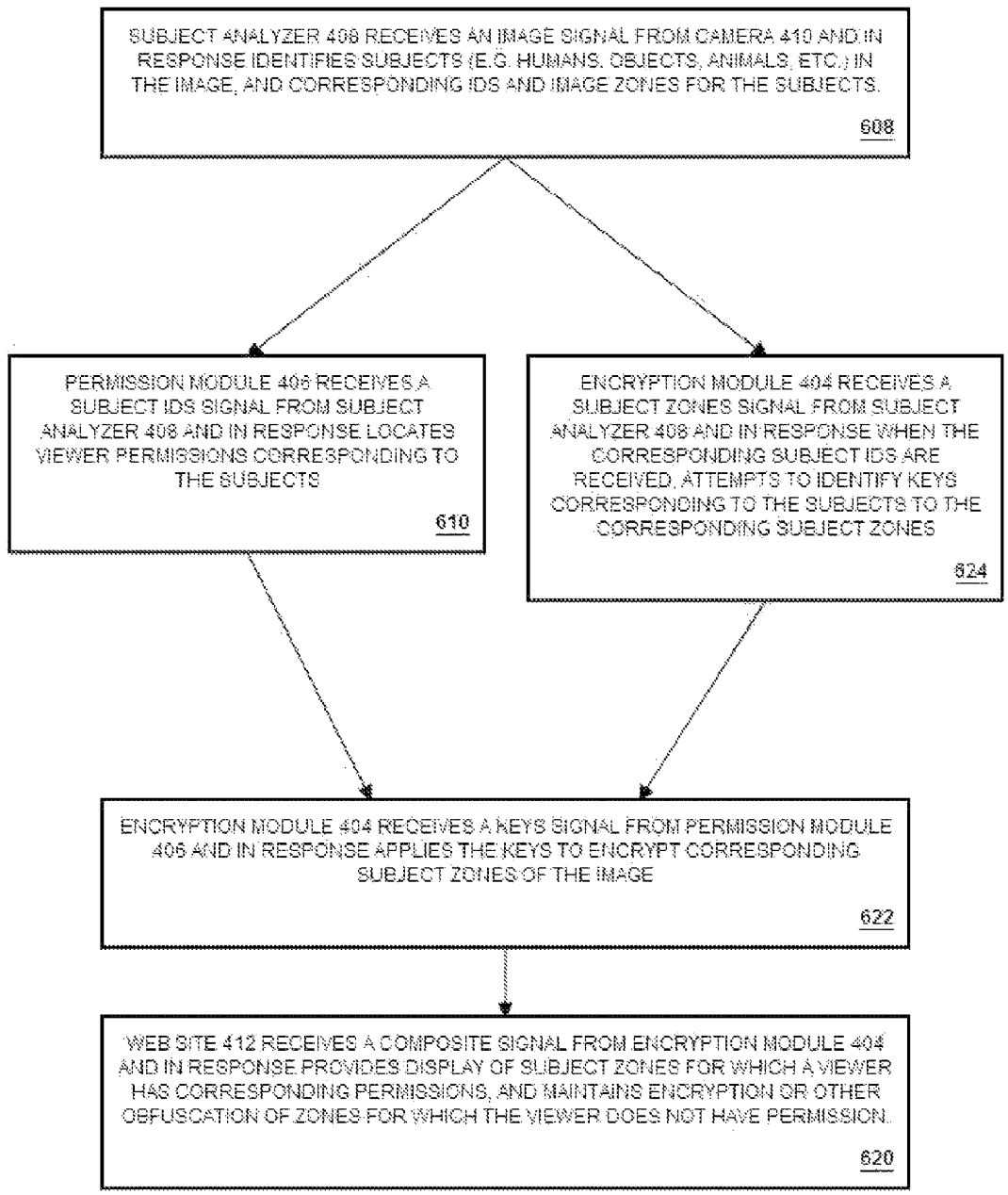
FIG. 6 is a flow chart of an embodiment of a system to apply permissions to subject zones in an image process.

FIG. 4 is a system diagram of an embodiment of a system to apply permissions to subject zones in an image. FIG. 5 is an action flow diagram of an embodiment of a system to apply permissions to subject zones in an image process. FIG. 6 is a flow chart of an embodiment of a system to apply permissions to subject zones in an image process. The system comprises encryption module 404, permission module 406, subject analyzer 408, camera 410, and web site 412. Subject analyzer 408 receives an image signal from camera 410 and in response identifies subjects (e.g. humans, objects, animals, etc.) in the image, and corresponding ids and image zones for the subjects. (608). permission module 406 receives a subject ids signal from subject analyzer 408 and in response locates viewer permissions corresponding to the subjects (610). Encryption module 404 receives a subject zones signal from subject analyzer 408 and in response when the corresponding subject ids are received, attempts to identify keys corresponding to the subjects to the corresponding subject zones (624). Encryption module 404 receives a keys signal from permission module 406 and in response applies the keys to encrypt corresponding subject zones of the image (622). Web site 412 receives a composite signal from encryption module 404 and in response provides display of subject zones for which a viewer has corresponding permissions, and maintains encryption or other obfuscation of zones for which the viewer does not have permission (620).

The system may thus distinctly (from one another) encrypt zones of the image in which particular subjects are identified by various means.

Figure 7:
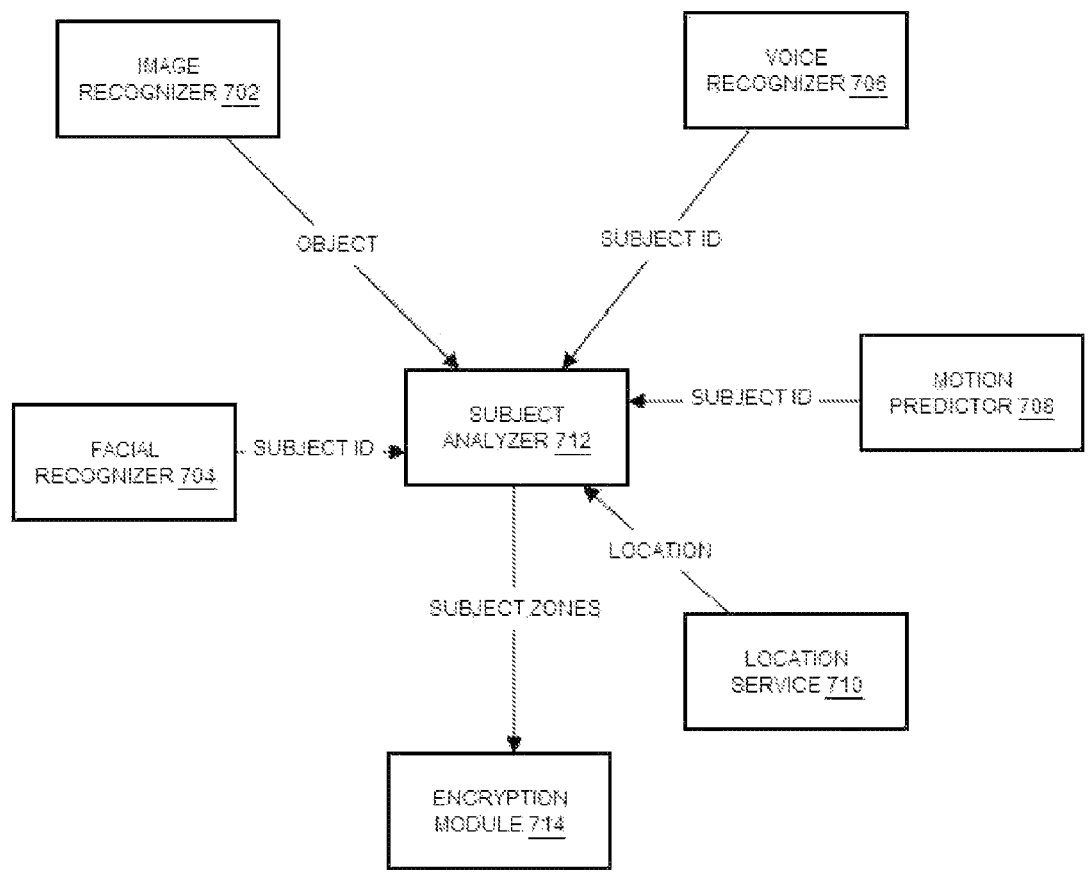
FIG. 7 is a system diagram of an embodiment of a subject analyzer system.
Figure 8:
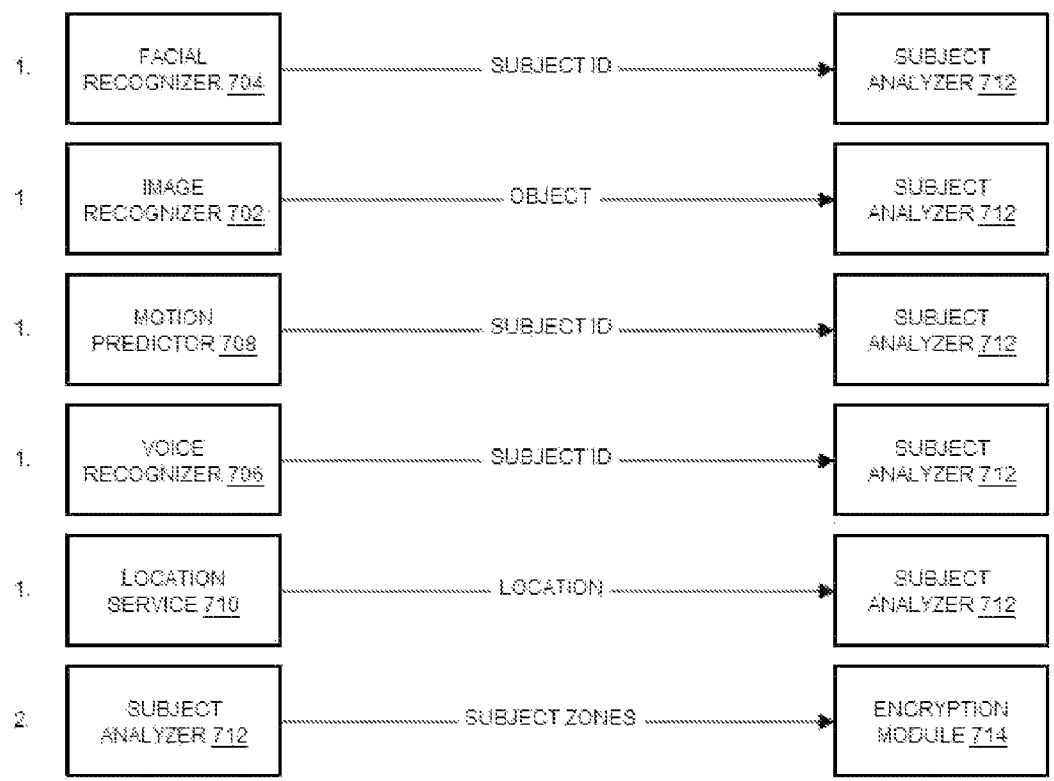
FIG. 8 is an action flow diagram of an embodiment of a subject analyzer system process.
Figure 9:
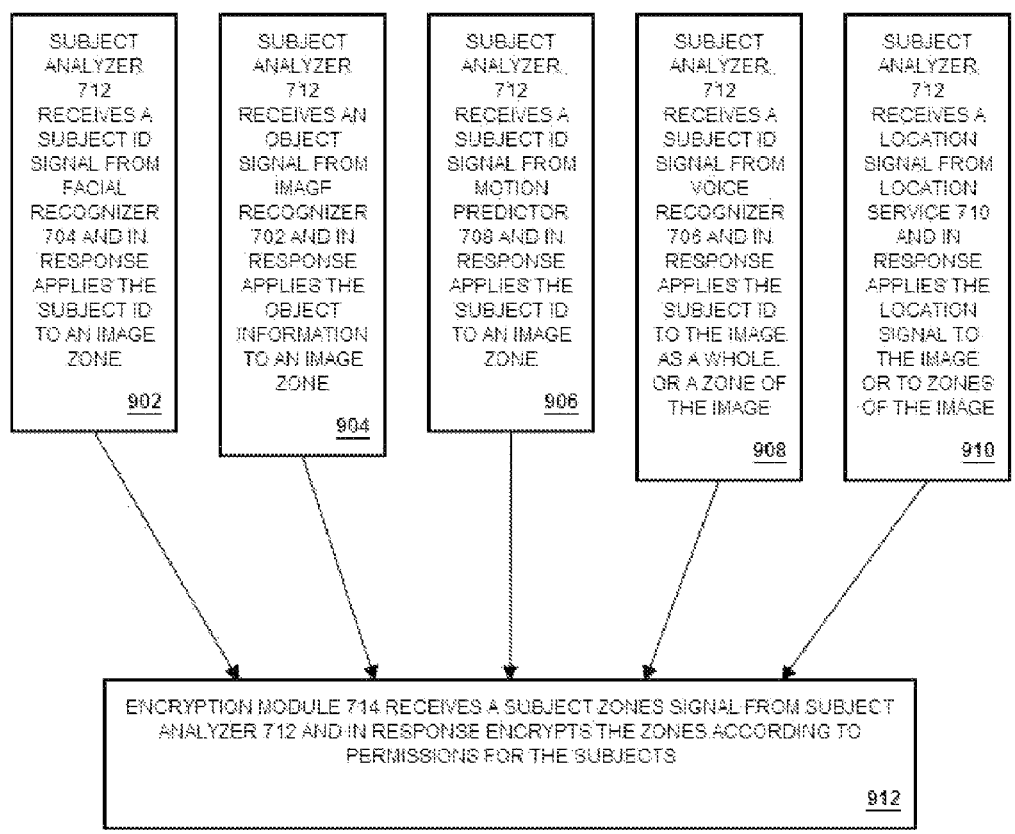
FIG. 9 is a flow chart of an embodiment of a subject analyzer system process.

FIG. 7 is a system diagram of an embodiment of a subject analyzer system. FIG. 8 is an action flow diagram of an embodiment of a subject analyzer system process. FIG. 9 is a flow chart of an embodiment of a subject analyzer system process. The system comprises image recognizer 702, facial recognizer 704, voice recognizer 706, motion predictor 708, location service 710, subject analyzer 712, and encryption module 714. Subject analyzer 712 receives a subject id signal from facial recognizer 704 and in response applies the subject id to an image zone (902). Subject analyzer 712 receives an object signal from image recognizer 702 and in response applies the object information to an image zone (904). Subject analyzer 712 receives a subject id signal from motion predictor 708 and in response applies the subject id to an image zone (906). Subject analyzer 712 receives a subject id signal from voice recognizer 706 and in response applies the subject id to the image as a whole, or a zone of the image (908). Subject analyzer 712 receives a location signal from location service 710 and in response applies the location signal to the image or to zones of the image (910). Encryption module 714 receives a subject zones signal from subject analyzer 712 and in response encrypts the zones according to permissions for the subjects (912).

Thus, as described previously, subject zones and subject ids to apply to image zones (thus forming subject zones) may be identified in various ways. The zones may then be encrypted with keys specific to the identified subjects (which can include objects/things that are not people).

Figure 10:
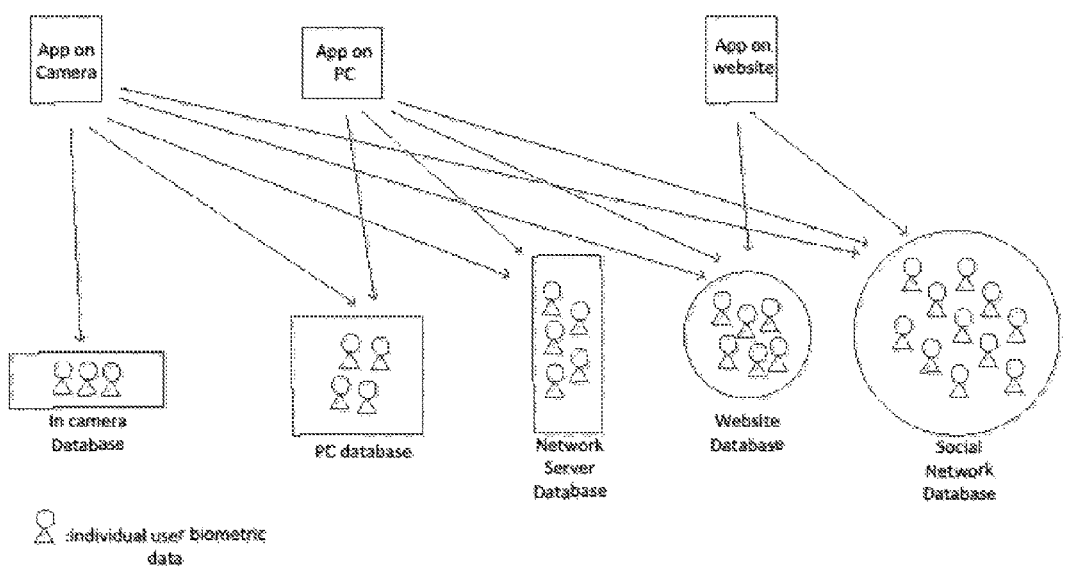
FIG. 10 illustrates an example of different locations at which image analysis may occur and different databases that may be utilized by each analysis step.

FIG. 10 illustrates different locations at which image analysis may occur and different databases that may be utilized by each analysis step. The analysis may take place on the camera device, on a pc, or at the associated website. Biometric data may be utilized from an on-device database, a PC-resident database (dedicated to the system or from iPhoto®, Aperture®, Lightroom®, etc.), a network server resident database (such as Microsoft Active Directory or a radius server), from a database at the accompanying website, or from another network service, for instance a social network like Facebook, LinkedIn®, Google+®, or Twitter®.

Figure 11:
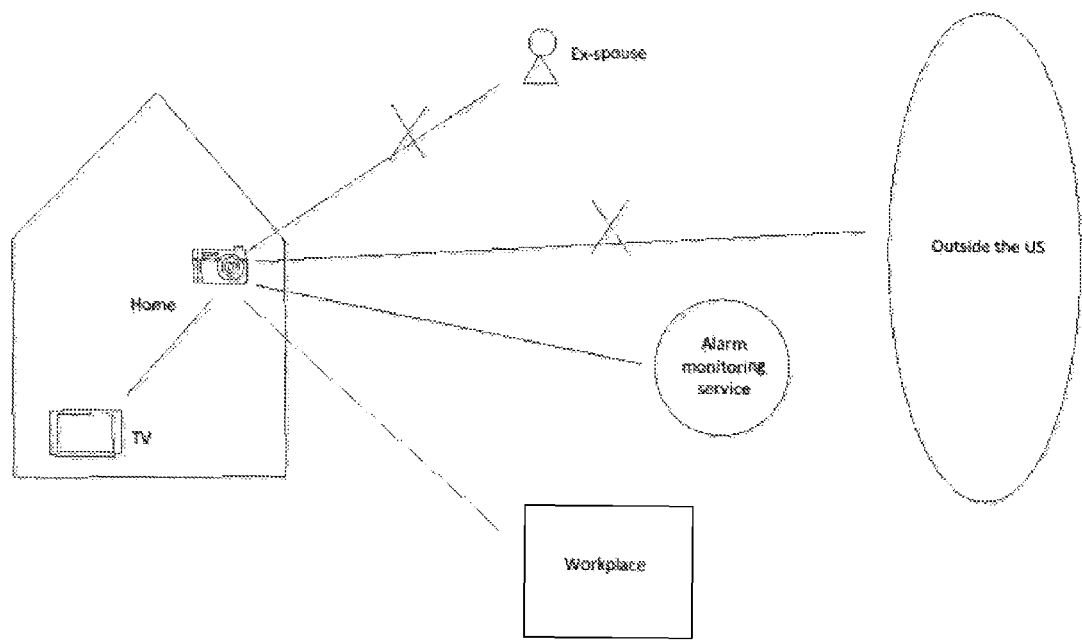
FIG. 11 illustrates an example of how location and identity may be combined to form viewing rights.

FIG. 11 illustrates how location and identity may be combined to form viewing rights. For instance, a stream captured at an operator's house may be viewable by any device in the house, by a device at the operator's workplace, by a viewer at the alarm monitoring service central office. However, the stream is not viewable under any circumstances by the ex-spouse of the operator, or overseas.

Figure 12:
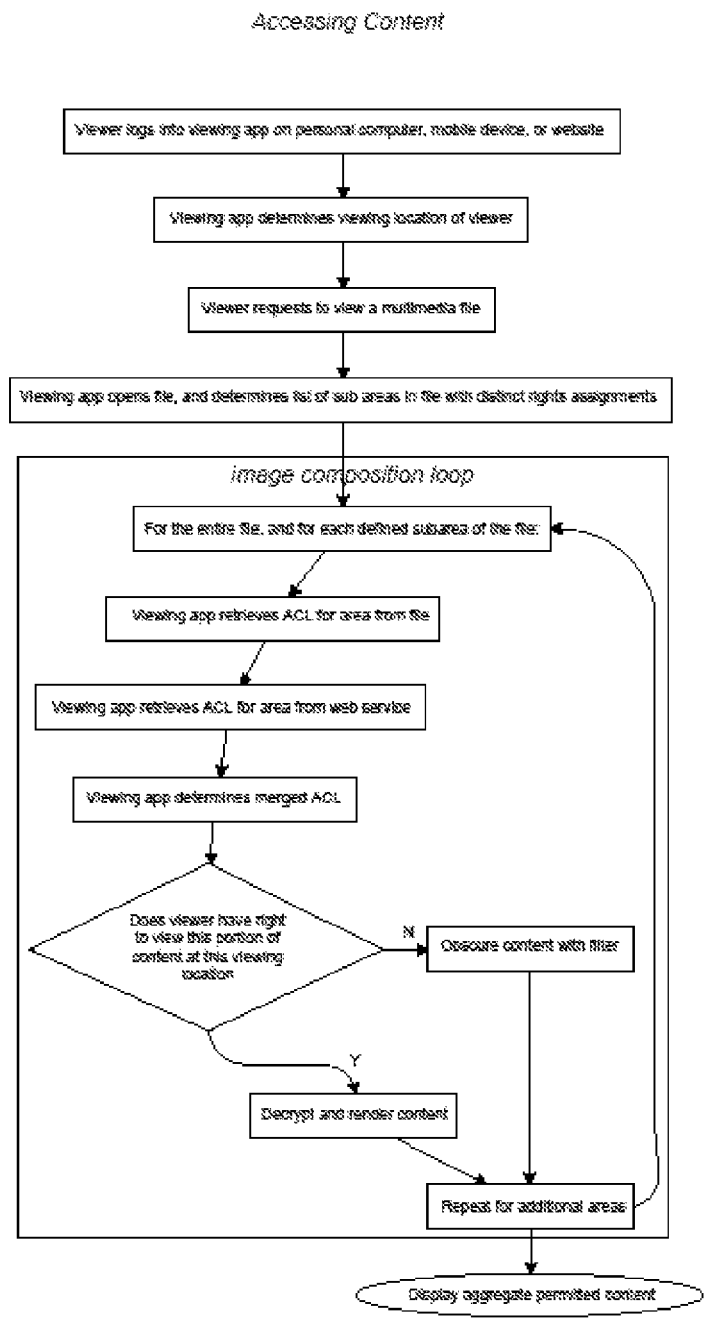
FIG. 12 illustrates an example of a process of image/video viewing control.

FIG. 12 illustrates a process of image/video viewing control. A person (viewer) wanting to view photos or videos logs into (authenticates to) the viewing application. In this example, the viewing application accesses location service information to ascertain a location of the viewer (actually, the location of the device they are going to view from). The viewer requests a file to view. The viewing application opens the file and identifies areas of the file with distinct rights assignments. These could correspond with distinct human subjects depicted in the image/video, for instance. For the file as a whole, and each separately encoded area of the file, an ACL (Access Control List) is retrieved and compared against an ACL for the area obtained from a web service. The combined permissions are examined to ascertain whether the viewer has the right to view each area of the image/video from the identified area the viewer is in. Areas for which permission is not configured are obscured or omitted from the final rendering. Areas for which permission is configured are decrypted and rendered. An aggregate of content that the viewer is permitted to view at the device location is thus rendered.

Figure 13:
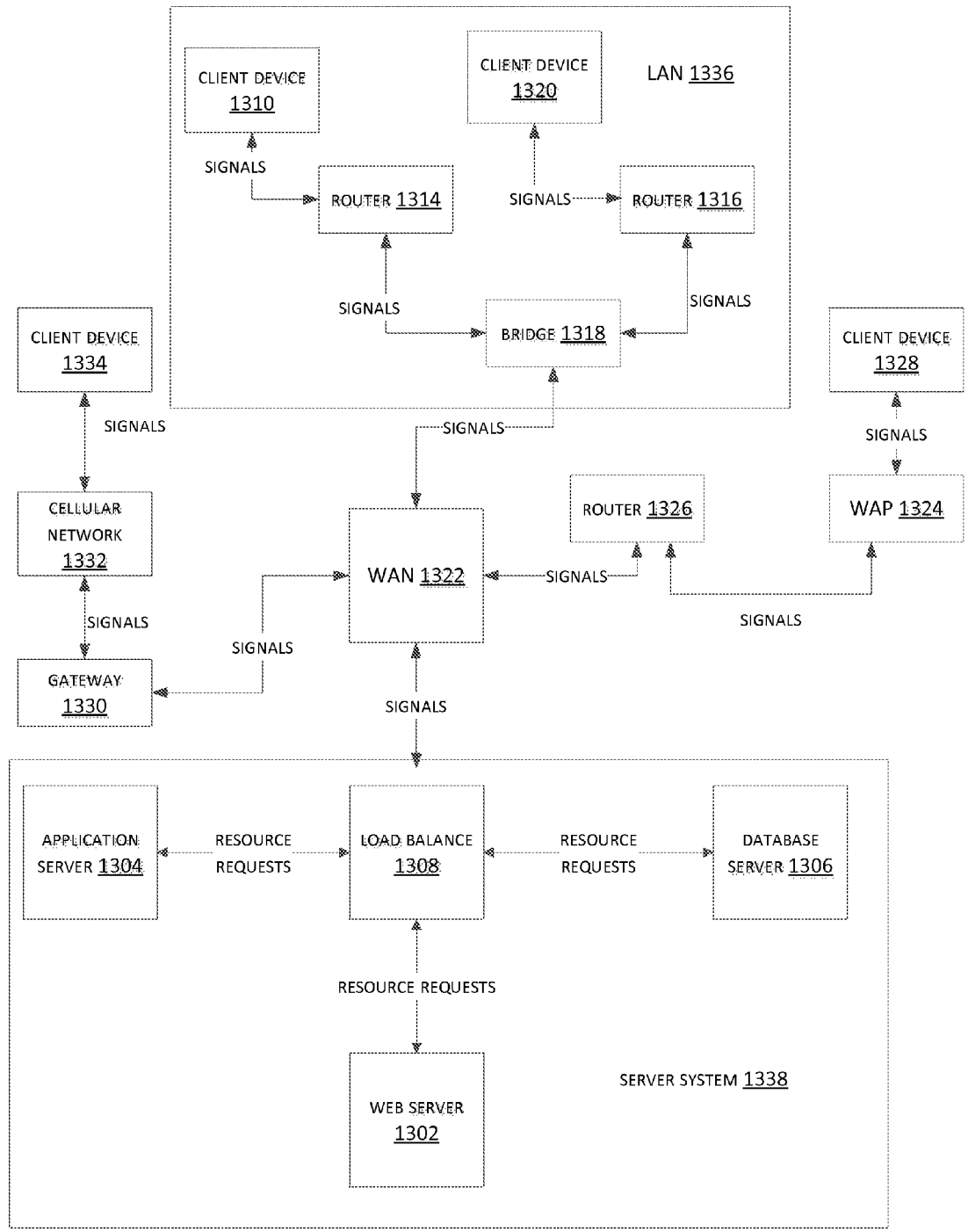
FIG. 13 illustrates a machine network embodiment for implementing a permission-based camera system.

A permission-based camera system as described herein may be implemented in one embodiment by the machine system illustrated in FIG. 13. Several network access technologies between client devices and server resources are illustrated, including cellular network 1332, LAN 1336, and WAP 1324. Signals representing server resource requests are output from client devices 1310, 1320, 1328>, and 1334 to the various access networks, from which they are propagated to a WAN 1322 (e.g., the Internet) and from there to a server system. These signals are typically encoded into standard protocols such as Internet Protocol (IP), TCP/IP, and HTTP. When the clients are part of a LAN 1336, the signals may be propagated via one or more router 1314 1316 and a bridge 1318. A router 1326 may propagate signals from the WAP 1324 to the WAN 1322. A gateway 1330 may propagate signals from the cellular network 1332 to the WAN 1322. The server system 1338 in this example comprises a number of separate server devices, typically each implemented in the separated machine, although this is not necessarily the case. The signals from the client devices are provided via a load balancing server 1308 to one or more application server 1304 and one or more database server 1316. Load balancing server 1308 maintains an even load distribution to the other server, including web server 1302, application server 1304, and database server 1306. Each server in the drawing may represent in effect multiple servers of that type. The load balancing server 1308, application server 1304, and database server 1306 may collectively implement a camera system as described herein. The signals applied to the database server 1306 may cause the database server 1306 to access and certain memory addresses, which correlates to certain rows and columns in a memory device. These signals from the database server 1306 may also be applied to application server 1304 via the load balancing server 1308. Signals applied by the application server 1304, via the load balancing server 1308, to the web server 1302, may result in web page modifications which are in turn communicated to a client device, as described herein in regards to user interface and interaction signals to and from a client device. The permission-based camera system described herein may thus be implemented as devices coordinated on a LAN, or over a wide geographical area utilizing a WAN or cellular network, or over a limited area (room or house or store/bar) utilizing a WAP. Features of client logic to view images produced by the permission-based camera system may thus be implemented, for example, as an application (app) on a mobile phone interfacing to a network in one of the manners illustrated in this figure. The permission-based camera system described herein may be implemented as a pure or hybrid peer to peer system in a local or widely distributed area.

Figure 14:
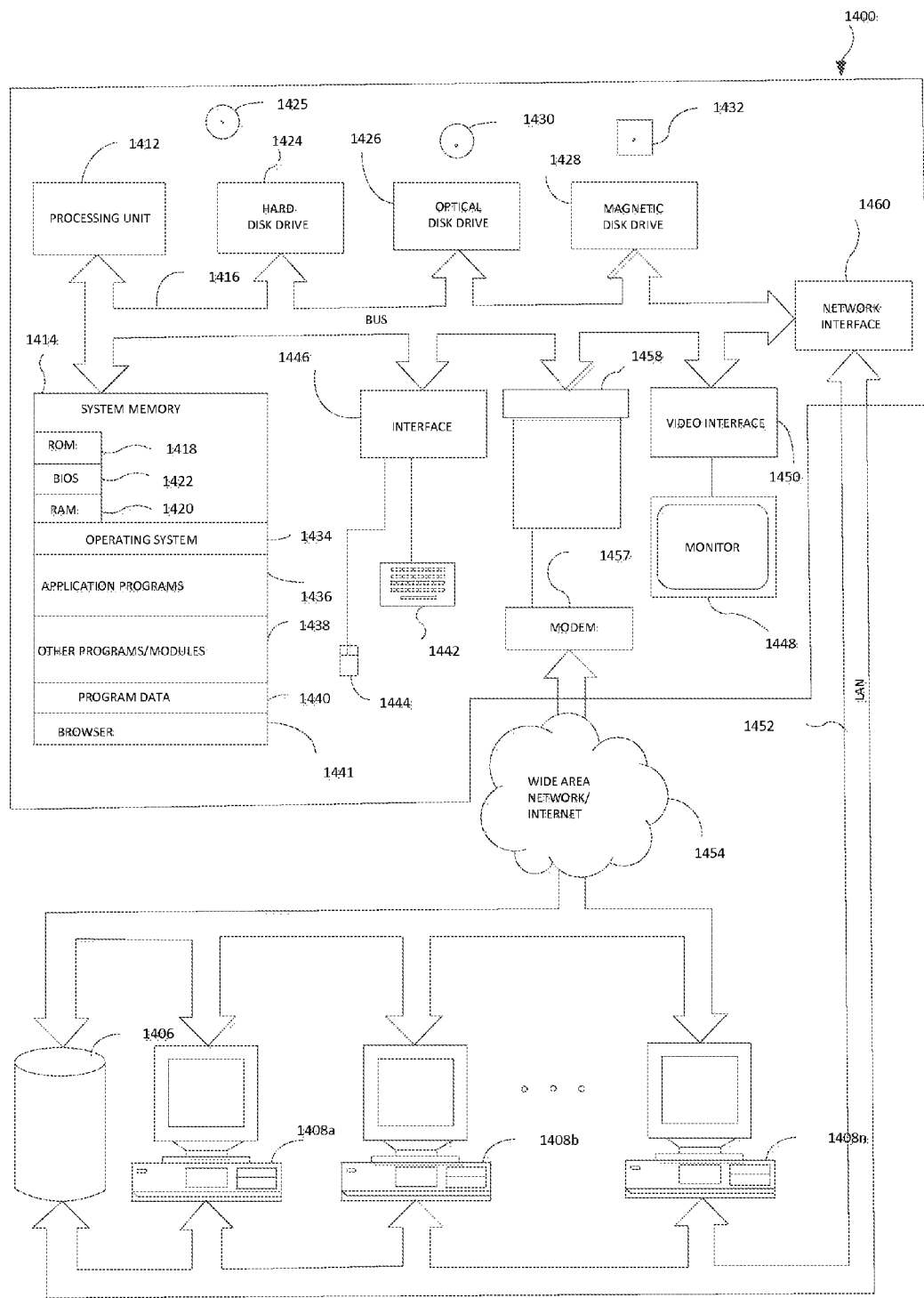
FIG. 14 illustrates a machine and machine network embodiment for implementing aspects of a permission-based camera system.

FIG. 14 illustrates an embodiment of a computer system machine and a machine communication network. The computer system 1400 may implement an embodiment of various modules or logic components as described herein. A particular computer system 1400 of the machine network may include one or more processing units 1412, a system memory 1414 and a system bus 1416 that couples various system components including the system memory 1414 to the processing units 1412. The processing units 1412 may be any logic processing unit, such as one or more central processing units (CPUs), digital signal processors (DSPs, application-specific integrated circuits (ASICs), field programmable gate arrays (FPGAs), etc. The system bus 1416 can employ any known bus structures or architectures, including a memory bus with memory controller, a peripheral bus, and a local bus. The system memory 1414 includes read-only memory (ROM) 1418 and random access memory (RAM) 1420. A basic input/output system (BIOS) 1422, which can form part of the ROM 1418, contains basic routines that help transfer information between elements within the computer system 1400, such as during start-up.

The computer system 1400 may also include a plurality of interfaces such as network interface 1460, interface 1458 supporting modem 1457 or any other wireless/wired interfaces.

The computer system 1400 may include a hard disk drive 1424 for reading from and writing to a hard disk 1425, an optical disk drive 1426 for reading from and writing to removable optical disks 1430, and/or a magnetic disk drive 1428 for reading from and writing to magnetic disks 1432. The optical disk 1430 can be a CD-ROM, while the magnetic disk 1432 can be a magnetic floppy disk or diskette. The hard disk drive 1424, optical disk drive 1426 and magnetic disk drive 1428 may communicate with the processing unit 1412 via the system bus 1416. The hard disk drive 1424, optical disk drive 1426 and magnetic disk drive 1428 may include interfaces or controllers (not shown) coupled between such drives and the system bus 1416, as is known by those skilled in the relevant art. The drives 1424, 1426 and 1428, and their associated computer-readable storage media 1425, 1430, 1432, may provide non-volatile and non-transitory storage of computer readable instructions, data structures, program modules and other data for the computer system 1400. Although the depicted computer system 1400 is illustrated employing a hard disk 1424, optical disk 1426 and magnetic disk 1428, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 1412.

Program modules can be stored in the system memory 1414, such as an operating system 1434, one or more application programs 1436 (e.g., encryption, permissions, subject analysis, image analysis, motion prediction, facial recognition, etc.), other programs or modules 1438 and program data 1440. Application programs 1436 may include instructions that cause the processor(s) 1412 to automatically provide dynamic selection of data and telecommunication service providers before or during communications between various devices such as, for example, a mobile device and a landline telephone. Other program modules 1438 may include instructions for handling security such as password or other access protection and communications encryption. The system memory 1414 may also include communications programs, for example, a Web client or browser 1441 for permitting the computer system 1400 to access and exchange data with sources such as Web sites of the Internet, corporate intranets, extranets, or other networks and devices as described herein, as well as other server applications on server computing systems. The browser 1441 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 1414, the operating system 1434, application programs 1436, other programs/modules 1438, program data 1440 and browser 1441 can be stored on the hard disk 1425 of the hard disk drive 1424, the optical disk 1430 of the optical disk drive 1426 and/or the magnetic disk 1432 of the magnetic disk drive 1428.

An operator can enter commands and information into the computer system 1400 through input devices such as a touch screen or keyboard 1442 and/or a pointing device such as a mouse 1444, and/or via a graphical user interface. Other input devices can include a microphone, joystick, game pad, tablet, scanner, etc. These and other input devices are connected to one or more of the processing units 1412 through an interface 1446 such as a serial port interface that couples to the system bus 1416, although other interfaces such as a parallel port, a game port or a wireless interface or a universal serial bus (USB) can be used. A monitor 1448 or other display device is coupled to the system bus 1416 via a video interface 1450, such as a video adapter. The computer system 1400 can include other output devices, such as speakers, printers, etc.

The computer system 1400 can operate in a networked environment using logical connections to one or more remote computers and/or devices. For example, the computer system 1400 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks. Communication may take place between the computer system 1400 and external devices via a WAN 1454 or LAN 1452. External devices may include other computer system 1408a-n (collectively, 1408) and external storage devices 1406.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

The invention claimed is:

1. A camera system, comprising:
  a camera;
  a memory;
  non-transitory logic to operate the camera to capture images or video and to store the images or video in the memory in an encrypted format, the encrypted format comprising multiple regions of the images or video encrypted with a first plurality of different keys, each of the first plurality of different keys corresponding to a human subject or object identified in the images or video;
  non-transitory logic to assign the first plurality of different keys for the multiple regions of the images or video to generic subjects at a first time; and
  non-transitory logic to assign a second plurality of different keys at subsequent times to the first time as the human subject or object is identified.

2. The camera system of claim 1, further comprising:
  all of the multiple regions further encrypted with a user key assigned to a user of the camera.

3. The camera system of claim 1, further comprising:
  non-transitory logic to detect a location of the camera; and
  non-transitory logic to selectively encrypt the multiple regions based on the human subject or object identified in each region of the multiple regions and the location of the camera.

4. A media viewing system, comprising:
  non-transitory logic to receive an image or video viewing request over a machine network interface;
  non-transitory logic to identify an image or video to open from the image or video viewing request, and to identify a requesting viewer;
  non-transitory logic to identify viewing permissions for each of multiple areas of the image or video, the viewing permissions specific to the requesting viewer and to a subject rendered in each area of the multiple areas; and
  non-transitory logic to return in response to the image or video viewing request an aggregate set of areas of the multiple areas that excludes areas for which the requested viewer lacks permission to view.

5. The media viewing system of claim 4, further comprising:
  logic to identify location viewing permissions for a location and time of the image or video, and a location and time of the viewing request; and
  logic to render the aggregate set of areas of the image or video that excludes areas for which the requesting viewer lacks the viewing permissions corresponding to the location viewing permissions.

6. A method comprising:
  operating a camera to capture images or video;
  storing the images or video in a memory in an encrypted format, the encrypted format comprising multiple regions of the images or video encrypted with a first plurality of different keys, each of the first plurality of different keys corresponding to a human subject or object identified in the images or video;
  assigning the first plurality of different keys for the multiple regions of the images or video to generic subjects at a first time; and
  assigning a second plurality of different keys at subsequent times to the first time as the human subject or object is identified.

7. The method of claim 6, further comprising:
  further encrypting all of the multiple regions with a user key assigned to a user of the camera.

8. The method of claim 6, further comprising:
  detecting a location of the camera; and
  selectively encrypting the multiple regions based on the human subject or object identified in each region of the multiple regions and the location of the camera.

* * * * *